UNITED STATES PATENT OFFICE.

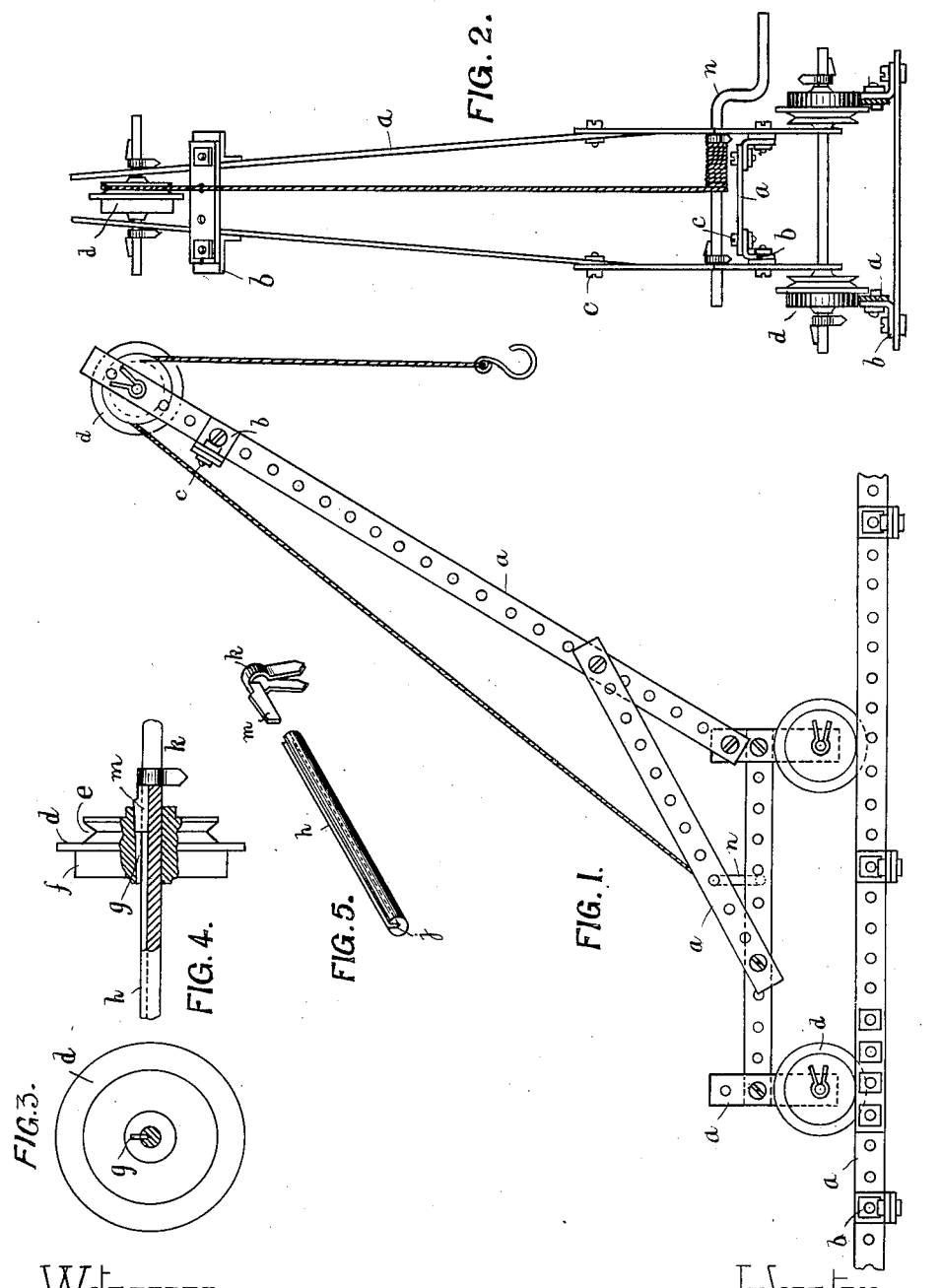

FRANK HORNBY, OF LIVERPOOL, ENGLAND.

TOY OR EDUCATIONAL DEVICE.

No. 810,148.      Specification of Letters Patent.      Patented Jan. 16, 1906.

Application filed July 22, 1901. Serial No. 69,311.

*To all whom it may concern:*

Be it known that I, FRANK HORNBY, manager, a subject of the King of Great Britain, residing in Liverpool, in the county of Lancaster, England, (whose full postal address is 10 Elmbank road, Sefton Park, Liverpool, aforesaid,) have invented certain new and useful Improvements in Toy or Educational Devices for Children and Young People, (for which provisional protection has been made in Great Britain under No. 587 and dated January 9, 1901,) of which the following is a specification.

This invention has for its object a toy or educational device for children.

There has been a long-felt want among young people for some device which will enable them to construct mechanical objects without the laboriousness of turning, boring, and careful adjustment. The present invention is designed to meet this want and provide means whereby the interest in mechanical construction from an elementary point of view is enhanced, in addition to providing an interesting means of mechanical education.

The present embodiment of the invention comprises a series of pieces so made that they can be built up and fastened together to form various objects—such as railway-lines, railway-curves, points, inclines, &c.—a certain amount of study, ingenuity, or intelligence being required to fit them together, so that the invention while being a toy is also useful as an educational device. The pieces are made of metal of various shapes and sizes—such as flat strips of various lengths and widths, angle-pieces, also of various lengths and widths to form framings, railway-sleepers, and other structures, round pieces or rods to make axles and shafts, and disks for forming wheels, with means for securing the wheels upon the axles or shafts as desired. The straight pieces are perforated with round holes, preferably about half an inch apart and a quarter of an inch from the edges. The angle-pieces are also pierced with holes, as is usual. By this means the pieces can be fastened together by bolts and nuts into a great variety of structures. The wheels or disks are provided with a center hole to admit of their being keyed to a rod or shaft. The metal rods or shafts are grooved longitudinally to admit of the wheels being keyed on by a child by the means which will now be described. This comprises a small piece of thin flat steel bent to grip or embrace the shaft. One side of the key is shaped in such a manner as to fit in the groove in the shaft and at the same time to enter a slot in the wheel. The other side of the key is straight and prevents the wheel from sliding along the shaft when not required to be keyed thereto. By providing the various pieces of different shapes with a series of holes they can be so assembled and fastened together that a child of ordinary ingenuity can build a toy railway-station, signal-boxes, lines, points, and other railway accessories without the use of special tools. Also various other objects can be assembled or built up by the exercise of a certain amount of study and ingenuity, and consequently the invention constitutes an educational device for the young as well as a toy.

To illustrate the invention, reference is made to the accompanying drawings, in which—

Figure 1 shows how the invention may be applied to building up a crane running on a railway-track; Fig. 2, an end view; Fig. 3, a side elevation of one of the wheels, the shaft being shown in section; Fig. 4, a longitudinal sectional view of a shaft carrying a wheel, the parts being locked together by the device hereinafter described; and Fig. 5, a perspective view of a shaft-section and one of the locking devices.

In the drawings, *a a* are the straight flat perforated strips.

*b b* are the angle-pieces, also pierced with holes; *c c*, bolts and nuts.

*d d* are the disks, which are each provided with a hole in the center and likewise formed with a V-groove *e* and flanged tread *f*, so that they may be used as either wheels or pulleys. These disks have each a small groove *g* adjacent to the center hole to admit of their being keyed to a shaft or rod.

*h h* are the metal shafts or rods, grooved longitudinally, as at *j*, to admit of the wheels being keyed thereon, and *k* a piece of thin flat steel formed with a tongue *m*, made of such size as to fit into the groove *j* in the shaft and at the same time into the groove *g* in the wheel. As will be noted upon reference to Figs. 3 and 4, when the tongue is seated in the groove *j* the wings of the member *k* embrace and pass partly around the shaft.

The flat pieces *a* may be used for building the crane shown in Figs. 1 and 2, the gib, platform, &c., being bolted together and then provided with wheels and axles and also with a pulley for the hoisting cord or rope. A crank $n$, passing through holes in the strips, forms a winch upon which the cord may be wound in the act of elevating the load.

Having thus described my invention, what I claim is—

1. In combination with a shaft having a groove extending longitudinally thereof; a member mounted upon said shaft and likewise provided with a groove upon its inner face; and an interlocking device formed of a piece of thin metal, said piece being bent or formed with a portion to embrace the shaft and with a laterally-projecting tongue, said tongue passing into the grooves and locking the shaft and member together, while the embracing portion remains without the member, substantially as described.

2. In combination with a shaft having a groove extending longitudinally thereof; a disk provided with a central opening and with a groove extending longitudinally of said opening, said disk being likewise provided with a groove $e$ extending around the same and with a flanged tread $f$; and an interlocking device formed of a piece of thin metal, said piece being bent or formed with a portion to embrace the shaft and with a laterally-projecting tongue, said tongue passing into the grooves and locking the shaft and disk together, while the embracing portion remains without said member, substantially as described.

In witness whereof I have hereunto signed my name, this 11th day of July, 1901, in the presence of two subscribing witnesses.

FRANK HORNBY.

Witnesses:
G. C. DYMOND,
J. McLACHLAN.